Aug. 3, 1937.  J. W. BEECHER  2,088,569
SPRING ATTACHMENT FOR MEASURING INSTRUMENTS
Filed July 29, 1936
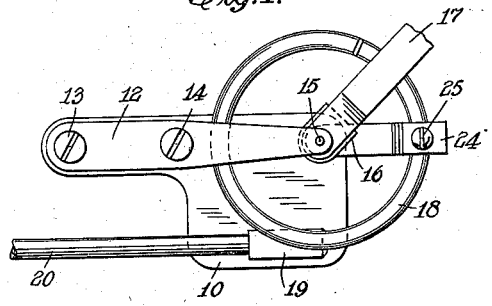
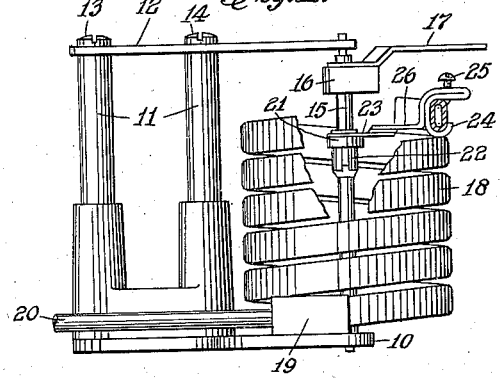
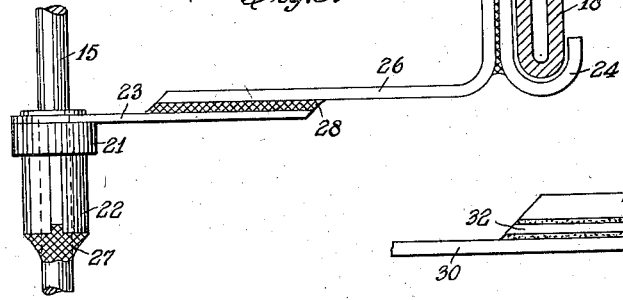
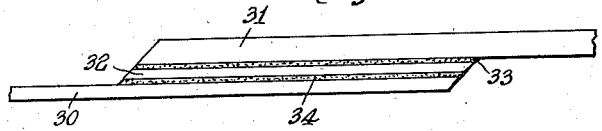
INVENTOR.
J. WINFRED BEECHER
BY
ATTORNEY.

Patented Aug. 3, 1937

2,088,569

UNITED STATES PATENT OFFICE 2,088,569

SPRING ATTACHMENT FOR MEASURING INSTRUMENTS

John Winfred Beecher, Waterbury, Conn., assignor to The Bristol Company, Waterbury, Conn., a corporation of Connecticut Application July 29, 1936, Serial No. 93,167

1 Claim. (Cl. 73—109)

This invention relates to an attachment member for measuring instruments of the class containing a sensitive element such as a Bourdon spring or bimetallic strip deflecting in response to variations of a magnitude which it is desired to measure; and it is directed more particularly to the type of instrument in which the sensitive element is connected to a shaft or the like which is to be oscillated in response to the deflections of the element by a substantially rigid link—the said connection being without joints or pivots.

In the manufacture and operation of instruments of this type, it has been found that certain stresses which may be set up during assembly may constitute a detriment to accurate operation, and may produce permanent strains resulting in erratic performance and undesirable wear of operating parts. These stresses may be radial, axial, bending, or torsional, or combinations of the same; and their introduction is generally due to a clamping action attendant upon the assembly of the deflecting element to the part directly actuated thereby.

A generally accepted method of uniting metallic parts without setting up stresses due to clamping consists in flowing molten metal between the parts when brought into close juxtaposition, and allowing it to solidify; but when used in connection with sensitive tubes or bimetallic strips, there exist two objections to the method, one being that the high temperatures involved may have undesirable effects on the sensitive element, and the other that the element may be fabricated from a metal, such as "stainless steel", with which solder or the like will not readily form a secure and dependable joint.

It is an object of this invention to provide a means of attachment between a spring of the class set forth and a shaft to be rotated thereby, wherein the necessary clamping actions and coarse adjustments may be effected in a preliminary stage of the assembly, after which the two elements of the mechanism may be brought into permanent engagement by means producing no strain in the assembled parts, the arrangement being such as to avoid exposing the sensitive measuring element to the undesirable influence of contact with molten metal.

A further object of the invention is to provide a joint of the class described which is readily adaptable to purposes of electrical insulation.

Still another object of the invention resides in the provision for the parts of an attachment which shall be simple in construction, effective in action, and capable of production at a low manufacturing cost.

In carrying out the invention, a sensitive, and spirally or helically coiled hollow spring measuring element, responsive to the variations of a magnitude, is secured to a concentrically or coaxially located spindle in such a manner that the latter is angularly deflected by the former about the longitudinal axis of said spindle, the connection being effected by first securing on the shaft and on the spring respective members each having an extended engaging surface. The two said extended surfaces are then adjusted to bring them into juxtaposition, whereupon a fluid material such as solder is placed between the surfaces and allowed to solidify to provide thereby a mechanically secure joint. If desired, particularly for electrical purposes, a piece of solid insulation material may first be interposed before applying the fluid material.

The nature of the invention, however, will best be understood when described in connection with the accompanying drawing, in which:

Fig. 1 is a plan view of an assembled measuring unit embodying the invention.

Fig. 2 is an elevation of the same, with a portion broken away.

Fig. 3 is an enlarged fragmentary elevation of a portion of the novel structure, more especially of the connecting means.

Fig. 4 is a fragmentary elevation of an alternative form of the connecting means.

Referring to the drawing, 10 designates a mounting plate having thereon pillars 11, to which a bearing plate 12 is affixed by means of screws 13 and 14. Journalled between said plates, with a degree of freedom for end play, is a shaft or spindle 15 having affixed thereto a block 16 serving as a mounting for a measuring pointer 17, or means for actuating the same. A helically coiled Bourdon spring 18 is attached to, and supported by, a block 19 mounted upon the plate 10, and maintaining the spring 18 in concentric relationship with the spindle 15. Communicating with the interior of the spring 18 is a tube 20 connected to a source of fluid under pressure and of the variations of which pressure the deflection of the Bourdon spring forms a measure.

Slidably mounted for axial adjustment on the spindle 15 is a hub 21 having a spring ferrule 22 whereby it may be frictionally engaged with the spindle, the hub being provided with a radially extending arm portion 23 for attachment to other elements of the mechanism as hereinafter set forth.

Partially encircling a convolution of the Bourdon spring 18 is a hooked clamp 24 having a screw 25 threadedly engaged therewith for firmly gripping the spring at any desired point on its circumference. The clamp 24 is formed preferably of a single piece, as shown in Fig. 3, doubled on itself in the vicinity of the spring 18 and rendered rigid by having solder flowed between its adjacent surfaces. It is provided, also, with an inwardly projecting radial arm part 26 of length sufficient to overlap the arm 23 when brought into radial alignment therewith. It will be apparent to those familiar with the construction of instruments of this class that the clamp 24, here shown as bent up from strap material, may with equal efficacy be provided in the form of a casting or a drop forging or be otherwise fabricated from metallic stock.

The procedure in assembling this device is as follows: The Bourdon spring 18 is mounted in place on the plate 10; and the spindle 15, having the hub 21 thereon, is then positioned between the plates 10 and 12 with a degree of freedom for axial movement therebetween. The clamp 24 is slipped over the end of the Bourdon spring 18 and slidably positioned thereon to a predetermined location, where it is fixed by tightening the screw 25. The hub 21 is then positioned axially on the spindle 15 and rotated until the arm 23 carried thereby is brought into juxtaposition to the arm 26 in an overlapping relationship, but not in actual contact therewith. The final locating of these parts is effected with the spindle 15 "floating" between the plates 10 and 12, allowing a degree of freedom for axial movement in either direction.

With the parts thus placed in correct relative position but without strain, the hub 21 is permanently secured to the spindle 15 by flowing a fillet of solder 27 between the ferrule 22 and the spindle. Solder is then flowed between the juxtaposed surfaces of the arms 23 and 26, solidifying into an intimate and permanent metallic connection 28 without subjecting the associated operating parts to stresses, and allowing free play of the spindle 15 in response to the slight axial distortion of the Bourdon spring as it deflects to various angular positions.

The type of joint above set forth provides not only a means of obtaining a secure mechanical connection without strain, but also makes possible the provision of electrical insulation should such be desired. In some forms of instruments, particularly where used as electrical controllers, it becomes desirable to insulate between the sensitive element and the shaft. This may be effected by using instead of solder or the like, an insulating cement, such as may be developed from a shellac base or some of the many available phenolic resins or cellulose acetate adhesives. The insulating properties of such a joint may be made more positive by interposing between the metallic engaging surfaces 30 and 31, shown in Fig. 4, a portion of insulating material 32 in sheet form, and cementing it to both said surfaces as at 33 and 34.

I claim:

In a measuring instrument, the combination with a spring element responsive to variations in a magnitude to be measured, and a shaft to be oscillated thereby about its longitudinal axis; of means for rigidly connecting the spring element to said shaft and comprising a clamp engaging said spring and having an arm extending therefrom affording a plane engaging surface perpendicular to said shaft, means carried by the said shaft having an extending arm with a plane surface substantially parallel to said first-named surface and in juxtaposition and overlapping relation thereto, means securing said second arm in a selected position along the longitudinal axis of the shaft, and means permanently uniting the juxtaposed arms.

J. WINFRED BEECHER.